(12) United States Patent
Tan et al.

(10) Patent No.: US 10,797,944 B2
(45) Date of Patent: Oct. 6, 2020

(54) ZIGBEE LIGHT LINK NETWORK COMMISSIONING

(71) Applicant: SIGNIFY HOLDING B.V., Eindhoven (NL)

(72) Inventors: Chen Min Tan, Shanghai (CN); Frank Zhang, Shanghai (CN); Shengli Zhang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 53 days.

(21) Appl. No.: 15/100,114

(22) PCT Filed: Nov. 21, 2014

(86) PCT No.: PCT/EP2014/075262
§ 371 (c)(1),
(2) Date: May 27, 2016

(87) PCT Pub. No.: WO2015/078778
PCT Pub. Date: Jun. 4, 2015

(65) Prior Publication Data
US 2017/0005860 A1 Jan. 5, 2017

(30) Foreign Application Priority Data

Nov. 29, 2013 (CN) .................. PCT/CN2013/001474
Jan. 15, 2014 (EP) ..................................... 14151219

(51) Int. Cl.
*H04L 12/24* (2006.01)
*H04W 84/20* (2009.01)
*H04W 12/08* (2009.01)

(52) U.S. Cl.
CPC ........ *H04L 41/0806* (2013.01); *H04L 41/084* (2013.01); *H04W 12/08* (2013.01); *H04W 84/20* (2013.01)

(58) Field of Classification Search
CPC .... H04W 84/20; H04W 12/08; H04L 41/084; H04L 41/0806
See application file for complete search history.

(56) References Cited

U.S. PATENT DOCUMENTS 9,054,892 B2 * 6/2015 Lamb ................... H04L 12/462
2006/0154598 A1 * 7/2006 Rudland ............... H04L 12/185
455/3.01

(Continued)

FOREIGN PATENT DOCUMENTS

CN 201355879 Y 12/2009
CN 101902380 A 12/2010

(Continued)

OTHER PUBLICATIONS

Zigbee Light Link Standard (Verson 1.0), Apr. 5, 2012, Zigbee Alliance, pp. 1-96.*

(Continued)

Primary Examiner — Redentor Pasia
(74) Attorney, Agent, or Firm — Meenakshy Chakravorty

(57) ABSTRACT

This invention generally relates to commissioning in Zigbee Light Link (ZLL) networks. The proposed solution takes advantage of the existing Touchlink procedure in order to enable a controller device joining a ZLL network without having to Touchlink with every single lighting devices comprised in the ZLL network. This way, the one or more lighting devices of the ZLL network may be directly controlled by the newly joined controller device after a single Touchlink thanks to the introduction of a commissioning device. The commissioning device may be configured to provide specific joining information and binding information to the controller device. Further, a timer in the com- (Continued)

missioning device may be triggered to lapse after a given period of time where the controller may be disconnected from the ZLL network.

15 Claims, 2 Drawing Sheets

(56) References Cited

U.S. PATENT DOCUMENTS

| | | | |
|---|---|---|---|
| 2007/0047481 A1 | 3/2007 | Fair et al. | |
| 2011/0149803 A1* | 6/2011 | McCormack | H04W 8/005 370/254 |
| 2011/0302282 A1* | 12/2011 | Dadlani Mahtani | H05B 37/0272 709/221 |
| 2012/0082062 A1* | 4/2012 | Mccormack | H04W 48/14 370/254 |
| 2012/0098445 A1* | 4/2012 | Park | H05B 37/0272 315/193 |
| 2012/0299509 A1* | 11/2012 | Lee | H04L 41/0806 315/291 |
| 2013/0010018 A1* | 1/2013 | Economy | H05B 37/0272 345/691 |
| 2013/0271004 A1* | 10/2013 | Min | H05B 33/0842 315/112 |
| 2013/0322281 A1* | 12/2013 | Ludlow | H04W 48/18 370/252 |
| 2014/0015415 A1* | 1/2014 | Lim | H05B 37/02 315/131 |
| 2014/0121786 A1* | 5/2014 | Chen | G05B 15/02 700/19 |
| 2014/0167931 A1* | 6/2014 | Lee | G08C 17/02 340/12.5 |
| 2014/0177469 A1* | 6/2014 | Neyhart | H04L 12/2807 370/254 |

FOREIGN PATENT DOCUMENTS

| | | |
|---|---|---|
| WO | 2008112248 A1 | 9/2008 |
| WO | 2012080881 A1 | 6/2012 |

OTHER PUBLICATIONS

Zigbee Alliance, "Zigbee Light Link Standard," Version 1.0, Zigbee Document 11-0037-10, Apr. 2012 (121 pages).

* cited by examiner

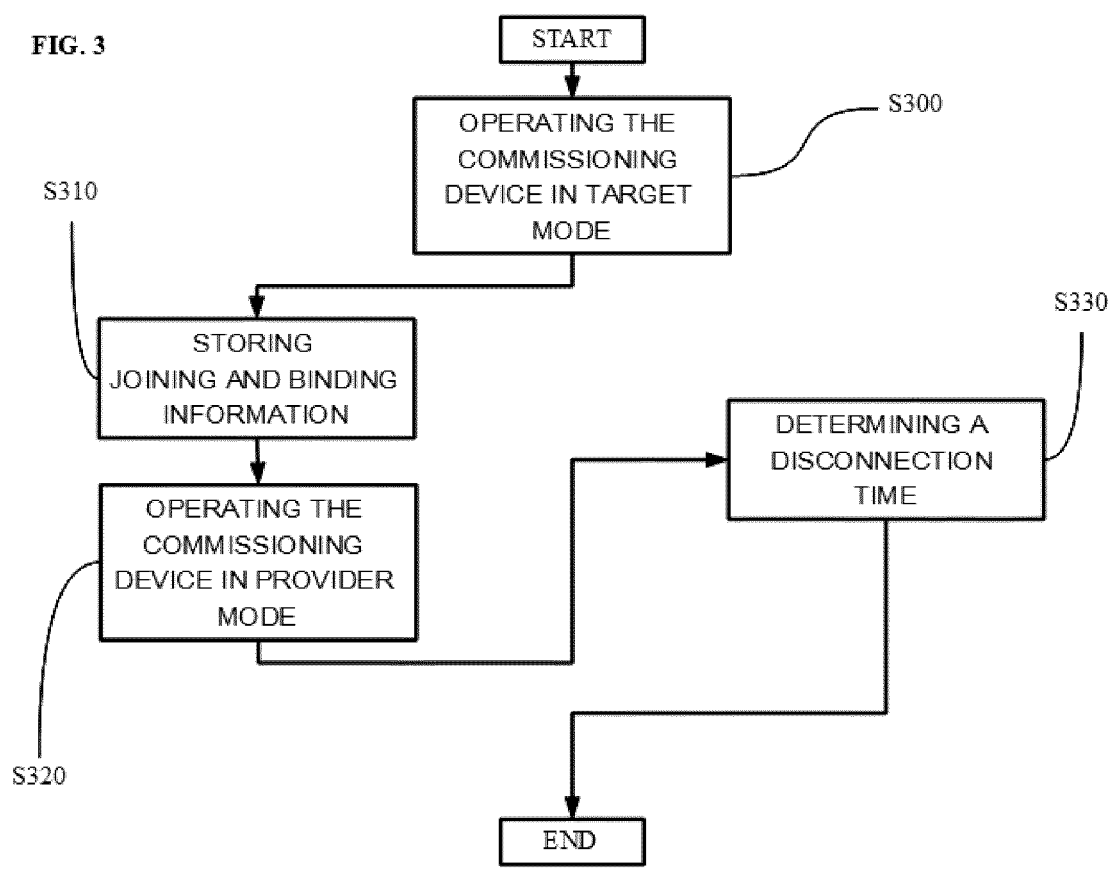

ZIGBEE LIGHT LINK NETWORK COMMISSIONING

CROSS-REFERENCE TO PRIOR APPLICATIONS

This application is the U.S. National Phase application under 35 U.S.C. § 371 of International Application No. PCT/EP2014/075262, filed on Nov. 21, 2014, which claims the benefit of PCT/CN2013/001474, filed on Nov. 29, 2013 and European Patent Application No. 14151219.4, filed on Jan. 15, 2014. These applications are hereby incorporated by reference herein.

FIELD OF THE INVENTION

This invention generally relates to commissioning in Zigbee Light Link networks.

BACKGROUND OF THE INVENTION

Recently, the lighting industry has been in the midst of digital revolution in which e.g. light sources have gone for LED (Light-Emitting Diode), drivers have gone digital and control has gone networked. This revolution has brought new ways of using lights particularly with the advent of smart devices, sensors and internet of things, for instance. Zigbee Light Link (ZLL) standard which is a public application profile devised for consumer lighting applications by the Zigbee Alliance based on Zigbee PRO wireless network protocol, is part of this digital revolution as it allows consumers to gain wireless control over their lighting devices (e.g. LED fixtures, light bulbs, projectors), in an easy-to-use fashion.

Unlike conventional Zigbee network, a ZLL network does not require a Zigbee Coordinator to initiate a network or accept join requests from Zigbee Routers and Zigbee End Devices. Indeed, ZLL networks only comprise Zigbee Routers (i.e. lighting devices) and Zigbee End Devices (i.e. controller device) wherein Zigbee End Devices are able to control Zigbee Routers via the use of application commands, for instance. The main result of this is that different ways of forming or joining a ZLL network, for instance, were elaborated. For example, joining a ZLL network is performed using a coordinatorless commissioning mechanism known as "Touchlink" which aims at replacing association buttons on lighting devices that would otherwise be required to facilitate commissioning. Under Touchlink, a target device (e.g. a lighting device) is added to a ZLL network by a controller device called the "initiator" (e.g. a controller device). More precisely, the joining process is started at the initiator (e.g. by pressing a button) and it is simply required to have the target device being physically close to the initiator device in order for the target device to be added to the ZLL network.

Notwithstanding the adequacy of Touchlink in the joining process of e.g. lighting devices to an existing ZLL network, some drawbacks may arise where it is required to join e.g. a controller device to an existing ZLL network. Such situation can occur, for instance, where a previous controller device of the existing ZLL network has been lost or is broken such that a new controller device is needed to take control over existing lighting devices. However under such situation, Touchlink is required with every single lighting device of the existing ZLL network. As can be seen, such task can be quite tedious, and as a consequence, it would be advantageous to provide a new mechanism for joining a ZLL controller device to an existing ZLL network.

SUMMARY OF THE INVENTION

The present subject application provides a system and a method of joining a Zigbee Light Link (ZLL) controller device to an existing ZLL network which does not comprise any ZLL controller device as described in the accompanying claims. Specific embodiments of the subject application are set forth in the dependent claims.

Certain embodiments of the subject application include a system for joining at least one controller device to a first Zigbee Light Link (ZLL) network having at least one lighting device connected thereto, the system comprising a commissioning device being part of the network. The commissioning device comprises a target module operable to cause the commissioning device to operate in a target mode during a single Touchlink procedure established between at least the controller device and the commissioning device in which the commissioning device is capable of joining the controller device to the network in response to the Touchlink procedure being initiated by the controller device. Additionally, if the controller device was not associated to a second ZLL network prior to the initiation of the Touchlink procedure, then no further ZLL network is created by the controller device during the Touchlink procedure. Also, if the controller device was associated to a second ZLL network prior to the initiation of the Touchlink procedure, the controller device leaves the second ZLL network during the Touchlink procedure.

In embodiments of the subject application further include a controller device for use in the system of the proposed application. The controller comprises a first processing unit operable to generate at least a first control message; a transceiver coupled to the first processing unit and operable to transmit the first control message and/or receive a second control message. In that embodiment, the first control message comprises a first information representative of the initiation of ZLL joining and binding mechanisms. Also, the second control message comprises a second information representative of the set-up of ZLL joining and binding mechanisms.

Others embodiments of the subject application include remote control unit comprising a communication apparatus operable in combination with the controller of the proposed application. The communication apparatus comprises a second processing unit adapted to generate at least one control commands and/or at least one information command. Additionally, the first control message is generated in response to the generation of the control command. Also, the information command is generated in response to reception of the second control message.

In certain embodiments of the subject application, it is included a method of joining at least one controller device to a first Zigbee Light Link, ZLL, network having at least one lighting device connected thereto. The method comprises the step of providing a commissioning device part of the network. The method further comprises causing the commissioning device to operate in a target mode, during a single Touchlink procedure established between at least the controller device and the commissioning device, to join the controller device to the network in response to the Touchlink procedure being initiated by the controller device. The controller device receives from the commissioning device at least one joining information associated with the first ZLL network. As a result, if the controller device was not associated to a second ZLL network prior to the initiation of the Touchlink procedure, not creating a further ZLL network during the Touchlink procedure. Also, if the controller device was associated to a second ZLL network prior to the initiation of the Touchlink procedure, the method further comprises causing the controller device to leave the second ZLL network during the Touchlink procedure.

Certain embodiments of the subject application also include a non-transitory computer readable medium having stored thereon instructions for causing one or more processing units to execute the method of the subject application.

In certain embodiments of the invention, it is included a commissioning device for joining at least one controller device to a first ZLL network having at least one lighting device connected thereto. This commissioning device is part of the ZLL network and comprises a target module operable to cause the commissioning device to operate in a target mode during a single Touchlink procedure established between at least the controller device and the commissioning device in which the commissioning device is capable of joining the controller device to the first ZLL network in response to the Touchlink procedure being initiated by the controller device. The commissioning device is arranged for providing the controller device with at least one joining information associated with the first ZLL network. Thus, as a consequence of this joining information no further ZLL network is created by the controller device during the Touchlink procedure, if the controller device was not associated to a second ZLL network prior to the initiation of the Touchlink procedure. Also, should the controller device be already part of a second ZLL network, the controller device leaves the second ZLL network during the Touchlink procedure as a result of receiving the joining information.

In other embodiments of the invention, it is proposed a controller device for being joined by a commissioning device to a first ZLL network having at least one lighting device connected thereto. Such a controller device comprises a first processing unit operable to generate at least a first control message for initiating a single Touchlink procedure established between the commissioning device operating in a target mode and the controller device in which the commissioning device is capable of joining the controller device to the first ZLL network. Coupled to the first processing unit, a transceiver coupled is operable to transmit the first control message and to receive from the commissioning device a second control message including at least one joining information associated with the first ZLL network. As a result of the joining information, no further ZLL network is created by the controller device during the Touchlink procedure, if the controller device was not associated to a second ZLL network prior to the initiation of the Touchlink procedure. Also, should the controller device be already part of a second ZLL network, the controller device leaves the second ZLL network during the Touchlink procedure as a result of receiving the joining information.

These and other aspects of the subject application will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIG. 3 is a schematic flow diagram of a method according to an embodiment of the subject application.

DETAILED DESCRIPTION OF THE PREFERRED EMBODIMENTS

Figure 1:
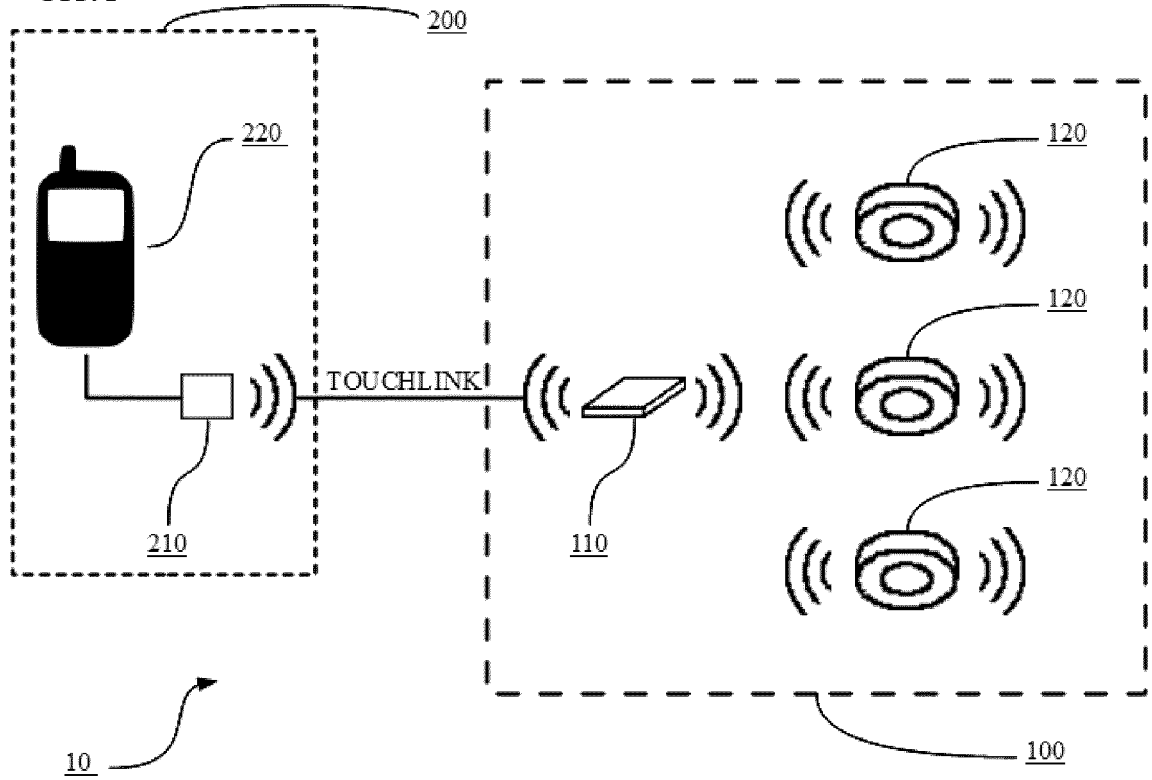
FIG. 1 is a schematic diagram of a system according to an embodiment of the subject application.

Because the illustrated embodiments of the subject application may for the most part, be composed of mechanisms, electronic components and circuits known to those skilled in the art, details will not be explained in any greater extent than that considered necessary for the understanding and appreciation of the underlying concepts of the subject application, in order not to obfuscate or distract from the teachings of the subject application.

However, for the sake of clarity, it will be briefly described how conventional Zigbee Light Link (ZLL) Touchlink is working. First, it is important to note that ZLL standard specifies two general categories of devices: ZLL lighting devices and ZLL controller devices. Lighting devices may include on/off light, dimmable light, color light, extended color light, and color temperature light, for instance. On the other end, controller devices may include light switches (e.g. on walls), occupancy sensors, remote control unit(s), smart phones, computing devices (e.g. PC or tablet). In ZLL networks, a controller device is termed an 'end-device' while a lighting device is termed a 'router'. Namely, an end-device has no capability of routing messages through a ZLL network while a router is capable of routing messages through a ZLL network. Touchlink, on the other hand, is basically the user operation of holding one controller device (i.e. the "initiator") physically close to one lighting device (i.e. the "target") in order to facilitate network connection between the two. In cases where the target already belongs to an existing ZLL network, the ZLL specification stipulates that during Touchlink, the initiator first sends a 'Join network as Router' command to the target. Then, in response to the foregoing command, the target issues a 'leave' command to the existing ZLL network before it can become part of the initiator's network. This operation is sometimes termed "stealing" a target (e.g. lighting device) from an existing network by an initiator (e.g. controller device) of another network through Touchlink. One should understand that such mechanism was elaborated purposely for consumer lighting applications. For example, where a consumer owns a controller device, every time he/she buys a new lighting device, the ZLL standard provides the consumer with the ability to control the newly acquired lighting device with the existing controller device through Touchlink. This way, whatever network the acquired lighting device was associated with prior Touchlink, the newly acquired lighting device would need to leave that former network before joining the existing network controlled by the existing controller device. However, where the existing controller device is lost or broken and that a new one is acquired, the newly acquired controller device is required to Touchlink with every single lighting device of the existing ZLL network in order to take control over them. As this can be quite bothersome and annoying, it is herein proposed an alternative Touchlink mechanism which may alleviate some of the above mentioned problems.

Referring to FIG. 1, there is diagrammatically shown therein a system 10 according to an embodiment of the subject application. The system 10 as shown comprises:

a first Zigbee Light Link (ZLL) network 100;
one remote control unit 200.

In the example of FIG. 1 as shown, the first ZLL network 100 comprises one or more lighting devices 120 and one commissioning device 110. The lighting devices 120 and the commissioning device 110 of FIG. 1 are ZLL routers which are capable of routing messages through the first ZLL network 100. Namely, the lighting devices 120 and the commissioning device 110 can communicate together without the need of a Zigbee coordinator as already explained above. Also, the lighting devices 120 and the commissioning device 110 are part of the same Personal Area Network (PAN) with the same PAN ID. In FIG. 1, all lighting devices 120 are bound to the commissioning device 110. The exemplary one or more lighting devices 120 may be lamps, LED fixtures, light bulbs, projectors or any combination thereof, for instance. In an example, the commissioning device 110 may be embodied in a wall switch panel which may comprise one switch button, for instance. Since the commissioning device 110 and the lighting devices 120 can communicate together, the switch button may be used to switch on or off all the lighting devices 120 of the first ZLL network 100 when needed. In another example, the commissioning device may be fixed or removable. In addition, the lighting devices 120 and the commissioning device 110 may be mains-powered, for instance.

In FIG. 1, the remote control unit 200 as shown comprises:

one controller device 210; and,
one communication apparatus 220 such as a smartphone or a tablet.

Figure 2:
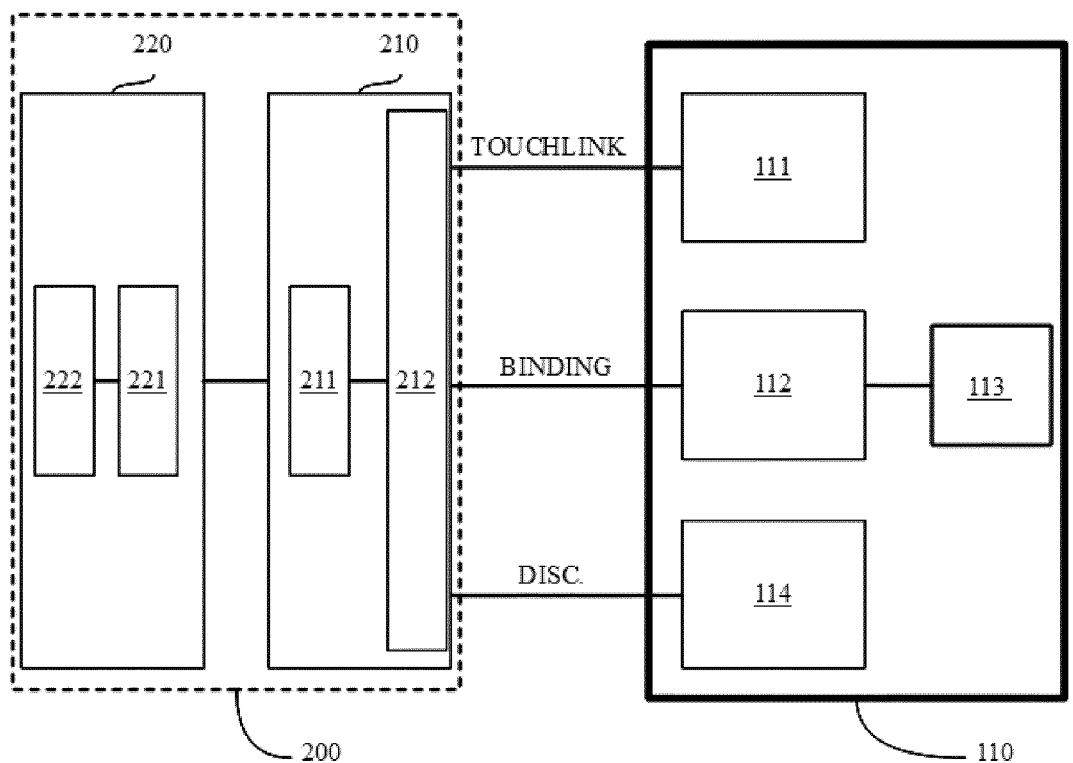
FIG. 2 is a schematic block diagram of a commissioning device and a remote control unit in accordance with the subject application.

Also, the remote control unit 200 is not part of the first ZLL network 100. For instance, the remote control unit 200 may be a factory new device or may be part of a second ZLL network different from the first ZLL network 100. The exemplary controller device 210 of FIG. 1 is a ZLL end-device node which thus has no capability of routing messages through a ZLL network, as already explained above. In FIG. 2, the controller device 210 comprises a first processing unit 211 such as a processor and operable to generate at least a first control message. For instance, the first control message may be compliant with an OSI standard format (e.g. MAC, Medium Access Control, standard format) or a ZLL standard format message. In an example, the first control message may comprise a first information representative of the initiation by the controller device 210 of ZLL mechanisms such as Touchlink or Binding. The controller device 210 further comprises a transceiver 212 operably coupled to the first processing unit 211 and operable to:

transmit at least the first control message; and/or,
receive at least a second control message.

For instance, the second control message may be compliant with an OSI standard format (e.g. MAC standard format) or a ZLL standard format message. In an example, the second control message may comprise a second information representative of the set-up of ZLL mechanisms, such as Touchlink or Binding, at the level of the controller device 210. The controller device 210 may be an electronic device such as a dongle adapted to be removably coupled to the communication apparatus 220. For instance, the controller device 210 may be removably coupled to a conventional port of the communication device 220 such as an USB port or a jack port. In addition, the controller device 210 may be battery-powered, for instance. In FIG. 2, the communication apparatus 220 comprises:

one second processing unit 221 such as a processor; and,
software elements 222.

In the example of FIG. 2 the second processing unit 221 is operably coupled to the software elements 222 and is adapted to generate at least one control command directed to the controller device 210. For example, the control command may have been generated in response to an event occurring in the software elements. Namely, the software elements may provide a graphical user interface which provides a button that can be actioned by a user of the communication apparatus 220 and that would trigger the generation of the control command. For example, the button in the graphical user interface may be associated with the initiation of ZLL mechanisms such as Touchlink or Binding. Therefore, the control command may be a Touchlink initiation control command or a Binding initiation control command, for instance. Referring to FIG. 2, the first control message may be generated in response to the reception of the control command from the communication apparatus 220. In the example as shown, the second processing unit 221 is also further adapted to generate at least one set-up command directed to the software elements. For example, the set-up command may have been generated in response to the reception of the second control message at the level of the controller device 210. Namely, the software elements may provide in the graphical user interface a window wherein the set-up command associated with the second control message are displayed such that a user of the communication apparatus 220 may be aware about the set-up of ongoing ZLL mechanisms. For instance, parameters needed to perform Touchlink or Binding may be the displayed in the window of the graphical user interface. Therefore, the set-up command may be a Touchlink set-up control command or a Binding set-up control command, for instance.

In the example of FIG. 1, the controller device 210 is adapted to Touchlink with the commissioning device 110. However, in the proposed Touchlink procedure, the controller device 210, which is an end-device, is not part of the first ZLL network 100 and is the "initiator" while the commissioning device 110, which is a router, is the "target". In an example, Touchlink may be initiated by approaching the controller device 210 at close-proximity to the commissioning device 110 and e.g. pressing a button situated on the graphical user interface of the associated communication device 220 or pressing a button located on the commissioning device 110. In response to that action and in contrast with conventional Touchlink procedure, in the proposed Touchlink procedure the controller device 210 is directly joined to the first ZLL network 100. Indeed, in conventional Touchlink procedure, it is not permitted to do so, as already explained above since Touchlink has to be made with every single lighting devices of the first ZLL network 100.

To summarise, the foregoing problem addressed by the subject application may be solved by allowing a controller device 210 to directly join a first ZLL network while in conventional Touchlink procedure, it would have been required to Touchlink with every lighting devices 120 of the first ZLL network 100. In other words with the proposed solution, a controller device 210 is able to commission more than one lighting devices 120, belonging to a first ZLL network 100, with a single Touchlink with the commissioning device 110 whereas in conventional Touchlink procedure, it would have been necessary to perform as many Touchlink procedures as there are lighting devices 120 in the first ZLL network 100. As can be seen, the proposed solution is quite convenient and practical. However it drastically differs from conventional mechanism. In fact, the ZLL specification does not prescribe the ability to add a factory new controller device 210 or already belonging to a ZLL network, to another ZLL network. Indeed, the ZLL standard only considers the case where the initiator is already part of the first ZLL network 100. Namely in that case, with conventional Touchlink, the initiator which is already part of the network first sends a 'Join network as End-Device' command to the target. Then, in response to the foregoing command, the target joins the existing network. In contrast, the proposed solution of the subject application addresses the case where the initiator is not part of the first ZLL network 100 that may have been pre-commissioned and to which it wishes to join. The proposed solution is made possible by the particular arrangement of the commissioning device 110. Namely, the commissioning device 110 is router which is already part of the ZLL network 100 prior the initiation of Touchlink and which may easily communicate with lighting devices 120 of the ZLL network 100. Therefore, it is mainly the addition of the commissioning device 110 which allows the ability of easily joining the controller device 210 to the first ZLL network 100.

Referring now to FIG. 2, the commissioning device 110 comprises a target module 111 operable to cause the commissioning device 110 to operate in a target mode during Touchlink between the commissioning device 110 and the controller device 210. As already explained earlier, Touchlink in the present subject application is initiated by the controller device 210 which is not part of the first ZLL network 100 prior the initiation of Touchlink. In an example, initiation of Touchlink could be performed by having the controller device 210 sending a request message to the commissioning device 110 for joining the ZLL network 100. For instance, the joining information may be sent via the first control message. In response to the request message, the commissioning device 110 may join the controller device 210 to the ZLL network 100. In an example, the commissioning device 110 may join the controller device 210 by providing the controller device 210 with joining information associated with the ZLL network 100 such as network parameters (e.g. PAN ID (Personal Area Network ID), network key). For instance, the joining information may be sent via the second control message and may later be converted to a set-up command usable at the software elements level 222. At this moment, the controller is not yet on the first ZLL network 100. However, communication is possible since it can occur at the MAC level, for instance. Then, based on the provided network parameters, the controller device 210 would be able to join the first ZLL network 100. This means that the controller device 210 would be part of the first ZLL network 100 and thus may obtain an IP (Internet Protocol) address for example. One of ordinary skills in the art of communication networks should note that in the proposed Touchlink procedure, where the controller device 210 was associated with second ZLL network different from the first ZLL network 100, the controller device 210 would have to leave the second ZLL network before joining the first ZLL network 100. Indeed, in ZLL specification, a controller device 210 may only be associated with a single network.

Referring to FIG. 2, the commissioning device 110 further comprises:
  a memory unit 113 such as a flash memory unit or the like; and,
  a provider module 112.

In FIG. 2, the memory unit 113 is operable to store at least the joining information associated with the first ZLL network 100 such as the PAN ID or the unique network key. In the example of FIG. 2, the provider module 112 is operably coupled to the memory unit 111. Further, the provider module 112 is operable to cause the commissioning device 110 to operate in a provider mode during Touchlink, wherein the commissioning device 110 is capable of providing at least the joining information to the controller device 210 in response to the controller device 210 initiating Touchlink with the commissioning device 110. Then, based on the provided network parameters, the controller device 210 is able to join the first ZLL network 100. In an example, the joining information may be provided to the controller device 210 via the second control message. Later, in response to the reception of the second control message at the controller device 210 level, initiating Touchlink is performed by having the controller device 210 sending the first control message to the commissioning device 110.

In an embodiment, while the commissioning device is in the provider mode and when the controller device 210 has joined the first ZLL network 100, the commissioning device 110 further provides to the controller device 210 binding information associated with at least one lighting device 120 and/or with at least one group of lighting devices 120 of the network. In an example, the binding information may be stored in the memory unit 113. In another example, the commissioning device 110 may have been pre-configured to allow the providing of binding information only associated with specific lighting devices 120 and not with the other ones which may be considered to be locked for control by a controller device 210. In another example, the binding information may comprise network identification information, physical location information and/or service information (e.g. lighting devices' capabilities, level of battery) of one more lighting devices 120 of the first ZLL network 100. In fact, after the controller device 210 has joined the existing network 100, it still does not have control over the lighting devices 120 and thus binding is necessary. Indeed, binding is the mechanism of attaching or connecting a ZLL node to another ZLL one or to a group of ZLL nodes. Therefore, based on the binding information (e.g. source ZLL node, destination ZLL node, and cluster ID) the controller device 210 is capable of being "bound" to one or more lighting device(s) 120 within the first ZLL network 100. Starting from there, the controller device 210 may control the lighting devices 120, for instance by sending the first control message over the first ZLL network 100 in response to the generation of control commands by the communication apparatus 220.

In another embodiment of the subject application, when the controller device 210 has joined the network and Touchlink has been completed, the commissioning device 110 may further comprise a timer module 114. In the example of FIG. 2, the timer module 114 is operable to:
  set a predetermined time,
  calculate a time during which the controller has been connected to the first ZLL network 100; and,
  determine whether the calculated time is more than the predetermined time.

Such timer can be used to control the period of time during which a controller device 210 may be connected to the first ZLL network 100 and thus may be able to control the lighting devices 120 thereof. This could have numerous applications in indoor as in outdoor environments.

In indoor environment, for instance, let's consider the case of a meeting room which access can be shared among several users and wherein each of them is owning a controlling device such as the remote control unit 200. Let's consider also that the meeting comprises the commissioning device 110 and a plurality of Zigbee devices such as the lighting devices 120 (e.g. lamps, screen for a retro projector and blind/curtain at the windows the meeting room), all belonging to the same network such as the first ZLL network 100. With the proposed solution, when a user enters the meeting room, commissioning can be performed by "touchlinking" the remote control unit 200 with the commissioning device 110. During Touchlink, the remote control unit 200 may send a request for joining the network to the commissioning device 110. In response to the request, the commissioning device may send joining information to the remote control unit 200 that would be used to join the network. After, the remote control unit 200 has joined the network 100; the commissioning device 110 may provide binding information to the remote control unit 200. For instance, location information may be provided, such that the communication apparatus 210 of the remote control unit 200 may display it on the graphical user interface (e.g. on a map window representing the room in which the network is installed). This way, the user of the remote control unit 200 may have the ability to choose on the map which lighting device(s) 110 he/she wishes to be bound with. The information may also indicate other devices that can be operated by the same interface, for example a screen, a projector, the air conditioning system of the room so that these other devices may also be controlled through the same user interface. That information may then be used by the remote control unit 200 in binding with the selected lighting device(s) 110. When Touchlink has been completed, the timer module 114 of the commissioning device 110 may be used to disconnect the remote control unit 200 from the first ZLL network 100 after a predetermined time of connection has lapsed. Indeed, since the meeting room is shared by several users, with the proposed solution it would be possible to book the meeting room for a given period (e.g. 30 minutes, 1 hour or one whole day) such that during that period, the remote control unit 200 is able to control the lighting devices 110 of the first ZLL network 100. However, after the predetermined time has lapsed, the remote control unit 200 would be disconnected and thus won't be able to control the lighting devices 110 anymore. In an example, the information of disconnection may be sent to the remote control unit 200 by the commissioning device 110 through the second control message. In another example, the remote control unit 200 may set the predetermined time of connection via the transmission of the first control message to the commissioning device 110. In yet another example, the remote control unit 200 may periodically determine its position with reference to commissioning device 110 and/or the lighting devices 120 of the ZLL network. This way, where the remote control 200 is outside a predetermined zone away from the commissioning device 110 and/or the lighting devices 120, the remote control device may delete all its references to the ZLL network. For instance, the position determination could be done by an energy detection scan.

In outdoor environment, for instance, let's consider the case of a public park having lighting decorations that can be controlled by different users of the park. The lighting decorations may comprise a commissioning device 110 and a plurality of lighting devices 120 that may have been already commissioned to the same ZLL network such as the first ZLL network 100. The users may control the lighting decorations in order to create specific lighting experience in a dedicated part of the park or throughout the park (e.g. having the lighting device 120 showing the shape of different animals or insects like a butterfly). For instance, a user having a communication apparatus 220 such as a tablet may plug a controller device 210 to it, thus creating a controlling device of the network such as the remote control unit 200. The user may then download dedicated software elements 222 onto the tablet in order to generate control commands for instance. For instance, both the controller device 210 and the dedicated software elements 222 may be provided by the park, as a rental service payable or free of charge, for instance. After that Touchlink has been performed with the commissioning device 110, the user may be able to control one or more lighting devices of the ZLL network. Later, after a predetermined time has lapsed, the controller device may be disconnected from the ZLL network. This way, subsequent users may be able to control the ZLL network as well.

Referring now to FIG. 3, there is diagrammatically shown therein a flow diagram of a method according to an embodiment of the subject application and with regard to system 10 of FIG. 1.

In S300, it is operated the commissioning device 110 in the target mode during a Touchlink established between the commissioning device 110 and a controller device 210, as already explained above.

In S310, it is stored, at the commissioning device 110, joining information associated with the first ZLL network 100 and binding information associated with the lighting devices 120, as already explained above.

Then, in S320 it is operated the commissioning device 110 in the provider mode where joining information and/or binding information are provided to the controller device 210 such that the latter can join the first ZLL network and bind with one or more lighting devices 120 of the ZLL network 100, as already explained above.

Later in S330, it is determined a disconnection time after which the controller device 210 is caused to be disconnected from the ZLL network 100, as already explained above.

The skilled person would appreciate that the proposed solution takes advantage of the existing Touchlink procedure in order to enable a controller device 210 joining a first ZLL network 100 without having to destroy the first ZLL network and without having to Touchlink with every single lighting devices 120 comprised in the first ZLL network 100. This way, the one or more lighting devices 120 of the first ZLL network 100 may be directly controlled by the newly joined controller device 210 after a single Touchlink. The commissioning device 110 may be configured to provide specific binding information to the controller device. This way, only certain lighting devices 120 of the first ZLL network 100 may be controlled by the controller device 210 while the others may stay, on purpose, uncontrollable by the controller device 210. Further, a timer in the commissioning device 110 may be triggered to lapse after a given period of time where the controller may be disconnected from the first ZLL network 100. Therefore, it is clear that replacing a lost remote control of a ZLL network is made is easy with the proposed solution. Additionally, where a consumer has no intention of having distance control (e.g. through Internet) over the lighting devices, a ZLL control bridge/router won't be necessary since a communication apparatus 220 such as a smartphone or a tablet can be directly integrated to the first ZLL network 100 thanks to the controller device 210 that can be operably coupled to it, thus providing ZLL remote control unit 200.

Of course, the above advantages are exemplary, and these or other advantages may be achieved by the proposed solution. Further, the skilled person will appreciate that not all advantages stated above are necessarily achieved by embodiments described herein.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

However, other modifications, variations and alternatives are also possible. The specifications and drawings are, accordingly, to be regarded in an illustrative rather than in a restrictive sense. For example, the controller device and the communication apparatus may be combined in a single unit instead of being two separate modules as it has been represented in the drawings.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The subject application scope is defined in the following claims and the equivalents thereto. Furthermore, reference signs used in the description and claims do not limit the scope of the subject application as claimed.

The principles of various embodiments of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. A commissioning device for joining at least one controller device to a first Zigbee Light Link, ZLL, network having at least one lighting device connected thereto, wherein the commissioning device is part of the ZLL network, the commissioning device comprising:
a target module operable to cause the commissioning device to operate in a target mode during a single Touchlink procedure established between at least the controller device and the commissioning device in which the commissioning device is capable of joining the controller device to the first ZLL network in response to the Touchlink procedure being initiated by the controller device;
wherein the commissioning device is arranged for providing the controller device with at least one joining information associated with the first ZLL network wherein, the commissioning device is further arranged for providing the controller device with binding information that is associated with at least one group of lighting devices of the first ZLL network when the commissioning device provides the binding information to the controller device.

2. The commissioning device of claim 1, further comprising:
a memory unit operable to store the at least one joining information associated with the first ZLL network;
a provider module coupled to the memory unit and operable to cause the commissioning device to operate in a provider mode during the Touchlink procedure.

3. The commissioning device of claim 2 wherein, while the commissioning device is in the provider mode:
the memory unit is further adapted to store the binding information associated with the at least one group of lighting devices of the network; and,
the commissioning device is further adapted to provide the binding information to the controller device once the controller device has joined the network.

4. The commissioning device of claim 3 wherein the binding information comprises network identification information, physical location information and/or service information.

5. The commissioning device of claim 1 wherein, the commissioning device further comprises a timer module operable to, when the controller device has joined the first ZLL network and the Touchlink procedure has been completed, set a predetermined time, calculate a time during which the controller device has been connected to the first ZLL network, and determine whether the calculated time is more than the predetermined time.

6. A controller device for being joined by a commissioning device to a first Zigbee Light Link, ZLL, network having at least one lighting device connected thereto, the controller device comprising:
   a first processing unit operable to generate at least a first control message for initiating a single Touchlink procedure established between the commissioning device operating in a target mode and the controller device in which the commissioning device is capable of joining the controller device to the first ZLL network;
   a transceiver coupled to the first processing unit and operable to transmit the first control message and to receive from the commissioning device a second control message including at least one joining information associated with the first ZLL network, the transceiver being arranged to receive from the commissioning device a third control message including binding information that is associated with at least one group of lighting devices of the first ZLL network when the transceiver receives the third control message from the commissioning device,
wherein no further ZLL network is created by the controller device during the Touchlink procedure, if the controller device was not associated to a second ZLL network prior to the initiation of the Touchlink procedure, and,
the controller device leaves a second ZLL network during the Touchlink procedure, if the controller device was associated to the second ZLL network prior to the initiation of the Touchlink procedure.

7. A system for joining the controller device to the first ZLL network having at least one lighting device connected thereto, the system comprising:
   the commissioning device, and
   the controller device of claim 6:
   wherein:
   the first control message comprises a first information representative of the initiation of ZLL joining and binding mechanisms;
   the second control message comprises a second information including the at least one joining information; and
   the third control message comprises the binding information associated with at least one group of lighting devices of the first ZLL network.

8. The system of claim 7 wherein:
   the first control message further comprises a third information defining a predetermined time; and,
   the second control message further comprises a fourth information adapted to launch a disconnection procedure from the first ZLL network.

9. The system of claim 7, wherein the controller device is part of a remote control unit, said remote control also including a communication apparatus operable in combination with the controller device and, wherein the communication apparatus comprises a second processing unit adapted to generate at least one control command and/or at least one information command;
   and wherein:
   the first control message is generated in response to the generation of the control command;
   the information command is generated in response to reception of the/a second control message.

10. A method of joining at least one controller device to a first Zigbee Light Link, ZLL, network having at least one lighting device connected thereto, the method comprising:
    providing a commissioning device that is part of the first ZLL network
    causing the commissioning device to operate in a target mode during a single Touchlink procedure established between at least the controller device and the commissioning device, to join the controller device to the first ZLL network in response to the Touchlink procedure being initiated by the controller device;
wherein the controller device receives from the commissioning device at least one joining information associated with the first ZLL network wherein, the controller device further receives from the commissioning device binding information that is associated with at least one group of lighting devices of the first ZLL network when the controller device receives the binding information from the commissioning device, and wherein:
    if the controller device was not associated to a second ZLL network prior to the initiation of the Touchlink procedure, not creating a further ZLL network during the Touchlink procedure; and,
    if the controller device was associated to a second ZLL network prior to the initiation of the Touchlink procedure, causing the controller device to leave the second ZLL network during the Touchlink procedure.

11. The method of claim 10 further comprising:
    storing the binding information associated with the at least one group of lighting devices of the first ZLL network;
    causing the commissioning device to operate in a provider mode during the Touchlink procedure, to provide the binding information to the controller device in response to the controller device joining the first ZLL network.

12. The method of claim 11 wherein the binding information comprises network identification information, physical location information and/or service information.

13. The method of claim 10 wherein when the controller device has joined the first ZLL network and the Touchlink procedure has been completed, the method further comprising:
    setting a predetermined time,
    calculating a time during which the controller being connected to the first ZLL network, and
    determining whether the calculated time is more than the predetermined time.

14. The method of claim 13, wherein when the calculated time is more than the predetermined time, causing the controller device to be disconnected from the first ZLL network.

15. A non-transitory computer readable medium having stored thereon instructions for causing one or more processing units to execute the method according to claim 10.

* * * * *